(12) United States Patent
Dodsworth (10) Patent No.: US 12,523,250 B2
(45) Date of Patent: Jan. 13, 2026

(54) BEARING SYSTEM FOR POT ROLLER (71) Applicant: McDanel Advanced Ceramic Technologies, LLC, Beaver Falls, PA (US)

(72) Inventor: John Dodsworth, Beaver Falls, PA (US)

(73) Assignee: McDanel Advanced Ceramic Technologies, LLC, Beaver Falls, PA (US)

( * ) Notice: Subject to any disclaimer, the term of this patent is extended or adjusted under 35 U.S.C. 154(b) by 0 days.

(21) Appl. No.: 18/873,027

(22) PCT Filed: Jun. 8, 2023

(86) PCT No.: PCT/US2023/024820
§ 371 (c)(1),
(2) Date: Dec. 9, 2024

(87) PCT Pub. No.: WO2023/239852
PCT Pub. Date: Dec. 14, 2023

(65) Prior Publication Data
US 2025/0305538 A1 Oct. 2, 2025

Related U.S. Application Data

(60) Provisional application No. 63/351,245, filed on Jun. 10, 2022.

(51) Int. Cl.
*F16C 13/02* (2006.01)
*C23C 2/00* (2006.01)
*C23C 2/40* (2006.01)

(52) U.S. Cl.
CPC .............. *F16C 13/02* (2013.01); *C23C 2/003* (2013.01); *C23C 2/40* (2013.01); *F16C 2202/22* (2013.01);
(Continued)

(58) Field of Classification Search
CPC ....................................................... F16C 33/16
See application file for complete search history.

(56) References Cited

U.S. PATENT DOCUMENTS 2,901,300 A   8/1959   Burr
4,363,631 A   12/1982  Wloka
(Continued)

FOREIGN PATENT DOCUMENTS

CN   109252123 A  *  1/2019   ............... C23C 2/06
JP   2020139454 A     9/2020
(Continued)

OTHER PUBLICATIONS

Translation of CN_109252123_A (Year: 2019).*
(Continued)

*Primary Examiner* — Jacob J Cigna
(74) *Attorney, Agent, or Firm* — Mintz Levin Cohn Ferris Glovsky and Popeo, P.C.

(57) ABSTRACT

A bearing system is configured for use between a roller journal and a support frame in a molten metal hot dip coating line for steel strip. The system includes a sleeve configured to attach to a journal and a bearing assembly comprising a bushing rotatably supporting the sleeve. The sleeve is made from solid cemented carbide. An elastically compressible layer joins the sleeve to the journal, wherein the sleeve and the journal are mechanically coupled to rotate together.

34 Claims, 5 Drawing Sheets

(52) U.S. Cl.
CPC ...... *F16C 2204/72* (2013.01); *F16C 2206/82* (2013.01)

(56) References Cited

U.S. PATENT DOCUMENTS

| | | | |
|---|---|---|---|
| 5,252,130 | A | 10/1993 | Ookouchi et al. |
| 5,711,613 | A * | 1/1998 | Ookouchi ........... F16C 33/6692 |
| | | | 384/283 |
| 6,037,287 | A | 3/2000 | Fukubayashi |
| 8,047,718 | B2 | 11/2011 | Kim et al. |

FOREIGN PATENT DOCUMENTS

| | | | | |
|---|---|---|---|---|
| KR | 20090004337 | U * | 5/2009 | ......... C23C 2/00344 |
| KR | 101228793 | B1 | 1/2013 | |
| WO | WO-2021/116727 | A1 | 6/2021 | |

OTHER PUBLICATIONS

Translation of KR-20090004337-U (Year: 2007).*
Parthasarathy, V. (2003)."Long-term performance of pot hardware in continuous galvanizing lines" Graduate Theses, Dissertations, and Problem Reports. 1395. 82 pages.

* cited by examiner

BEARING SYSTEM FOR POT ROLLER

CROSS REFERENCE TO RELATED APPLICATIONS

This application is a National Stage of International Application No. PCT/US2023/024820 filed on Jun. 8, 2023, which claims the benefit of priority under 35 U.S.C. § 119(e) to U.S. Provisional Patent Application Ser. No. 63/351,245, filed Jun. 10, 2022. The disclosure of which are herein incorporated by reference in their entireties.

BACKGROUND

The disclosure relates to an article for use in coating a substrate with molten metal, namely a bearing assembly for use on a submerged roller which conveys steel strip through a molten metal bath.

Coating steel strip with metals or alloys improves corrosion resistance, increasing the value of the strip. Coated steel is used extensively in many applications, including construction, household appliances, and automotive. Common coatings include zinc (galvanized), 95 zinc/5 aluminum (galfan), 55 aluminum/45 zinc (galvalume), and pure aluminum (aluminized).

Figure 1:
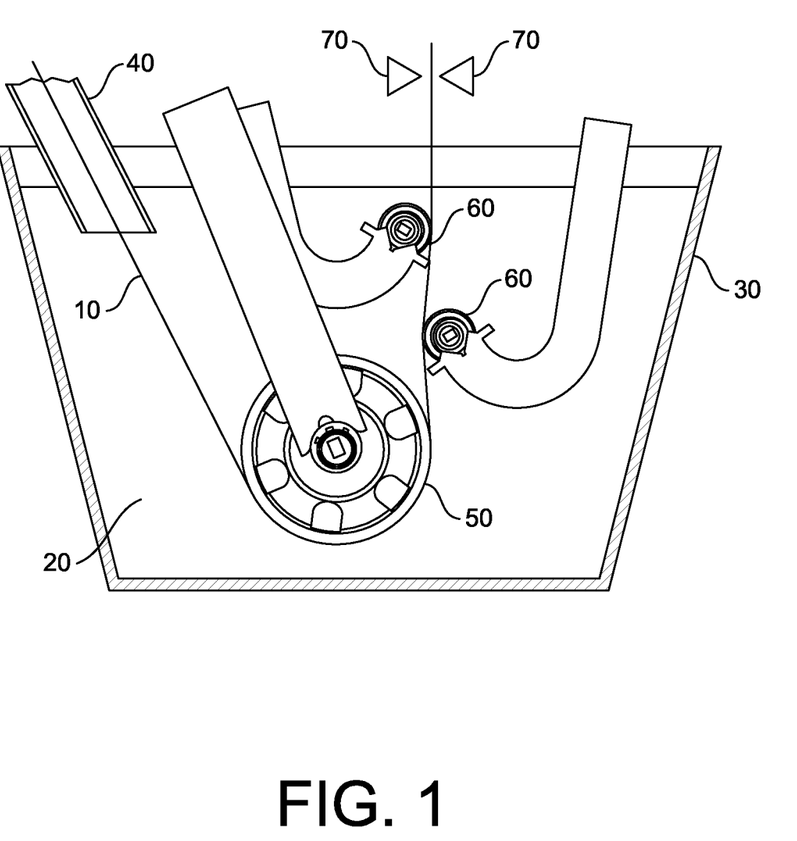
FIG. 1 is a sectional view of the pot roller configuration of a molten metal coating line.

The most economical method for applying this metal coating is via a hot dip coating line. As illustrated in FIG. 1, the steel strip 10 is feed into the molten metal bath 20 held in pot 30 through a protective shroud or snout 40, then is redirected by a sink roller 50, and passes between two smaller stabilizing rollers 60 before exiting the bath 20. Gas knives 70 immediately above the bath surface remove excess molten material for a uniform coating.

Coating line productivity is highly dependent on continuous operation and interruptions are costly. One of the main causes of undesirable maintenance outages is sink roller bearing failure.

A type of bearing system well suited for pot rollers is a sleeve bearing. U.S. Pat. No. 8,047,718 describes a sleeve bearing for a roller of a hot dipping line, including a sleeve fastened to the shaft of the roller and a bearing housing having a bushing internally fixed to support the sleeve.

Figure 2:
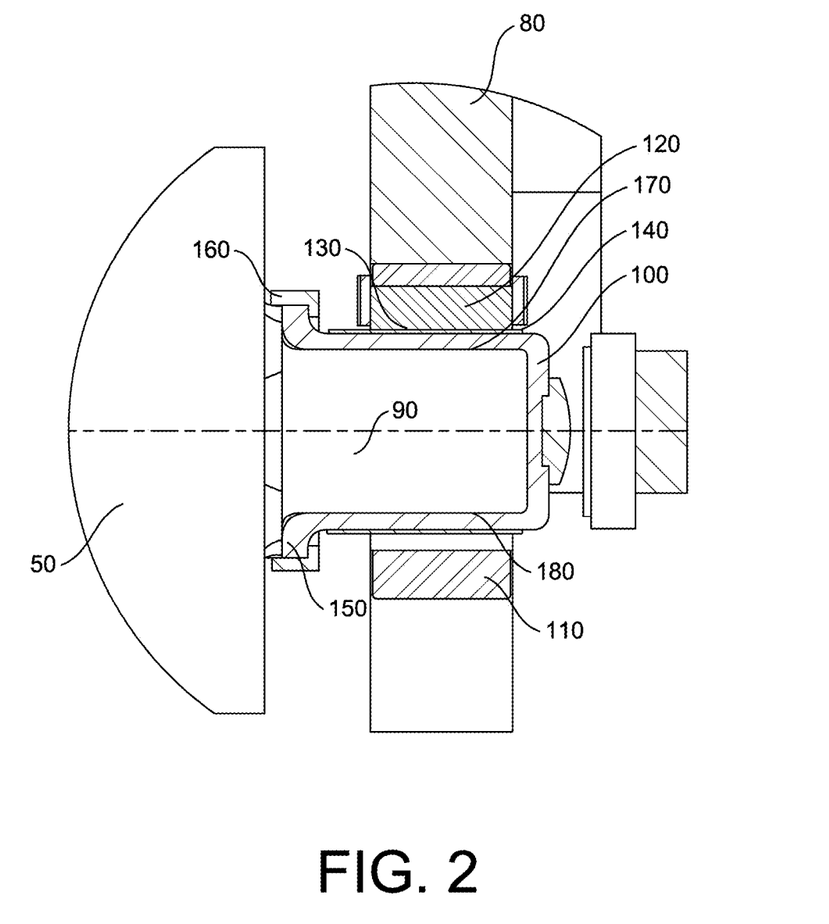
FIG. 2 is a sectional view of a prior art bearing system for a molten metal coating line.

FIG. 2 depicts a pot sink roller 50 fitted with a bearing system according to the prior art. The bearing system includes a sleeve 100, fitted over journal 90 and a bearing assembly attached to support frame 80 and mounted around sleeve 100. The bearing assembly consists of a bearing housing 110 and bushings 120 having bushing surface 130 adapted to slidably engage the outer surface 140 of sleeve 100. Preferably sleeve 100 includes lip 150.

During assembly, sleeve 100 is pushed onto journal 90, then retaining ring 160 is slid over sleeve 100 and is welded to journal 90. Retaining ring 160 engages lip 150 to prevent sleeve 100 from moving laterally with respect to journal 90.

In such pot roll bearing systems, the sleeve 100 rotates within the bearing housing 110 with the inner surface 130 of the bushing in sliding contact with the outer surface 140 of the sleeve. These sliding surfaces are in contact with and lubricated by the molten metal. As the molten metal is at an elevated temperature and highly corrosive, sleeves and/or bushings made from standard bearing materials exhibit rapid wear and fail prematurely.

As shown in FIG. 1, sink roller 50 is used to apply tension to the strip 10 as it redirects the strip to exit the pot 30. Sink roller 50 is under the most stress and the sink roller bearings have the highest failure rate.

A Masters Thesis submitted by Venkatesh Parthasarathy to West Virginia University in 2003 and entitled "Long-Term Performance of Pot Hardware in Continuous Galvanizing Lines" included the following: "Typically, materials used for the bearing sleeve are Stellite 6, CF3M (cast version 316 stainless steel) with tungsten carbide laser cladding, Tribaloy T-800, Tribaloy T-400, and Metaullic 2012 and 2020. These bearing sleeves work with maximum efficiency when they are run against appropriate bushing materials. Typical bearing sleeve and bushing assembly used in production lines are Stellite 6 sleeve against half moon Stellite 6 bushing, CF3M with tungsten carbide laser cladding against SiAlON ceramic, Tribaloy T-800 sleeve against half moon Tribaloy T-800 bushing or Metaullics 2012 sleeve against Metallic (sic) 2012 self aligning bushing." (page 4).

U.S. Pat. No. 6,037,287 by Praxair S.T. Technology, Inc. and entitled "Laser Clad Pot Roll Sleeves and Bushings for Galvanizing Baths" describes the desirability of tungsten carbide as the wear resistant material of the outer surface of the sleeve. In the patent, several known processes are compared for applying a coating such as tungsten carbide. These processes include weld overlay, spray fuse process and transferred plasma arc. According to the patent, none of these processes was able to apply a coating of sufficient thickness for use on a pot roller sleeve since the coating thickness is limited to a few millimeters and the coating wears away relatively quickly during use. The patent describes a wear resistant coating for journals, journal sleeves and bushings on submerged rolls in a molten metal coating bath comprising a tungsten carbide composite applied through laser-melting, also known as laser-cladding.

The use of a sleeve made from 316L stainless steel with a corrosion—and wear-resistant overlay containing tungsten carbide particles applied by laser cladding to run against bushing products such as the advanced ceramic material marketed by McDanel Advanced Ceramic Technologies under the brand name "WEARGUARD" has been found to reduce wear and save cost by extending pot roll campaigns. However, the coating thickness achievable with laser-cladding is also relatively thin and wears away or spalls off of the journal.

As described in the prior art, sleeves of wear resistant materials have been attached over sink roll journals through shrink fitting, also known as an interference fit. When a sleeve comprising stainless steel coated with tungsten carbide is fitted over a stainless steel journal, the sleeve can be shrink fitted and/or welded to the journal.

Another wear resistant material, Sialon, has been used to form solid journal sleeves. As the coefficient of thermal expansion of Sialon is much lower than that of stainless steel, great care must be taken to create an interference fit that won't generate an impermissible level of stress on the interior of the Sialon sleeve during operation at elevated temperatures. In U.S. Pat. No. 5,252,130, Hitachi, Ltd. described fitting a ceramic member in the form of a cylinder to the outer periphery of the stainless steel roller shaft journal by using an intermediate member serving as a stress buffer, the intermediate layer consisting of a metal which has a low yielding point and which can thereby be elastic-plastically deformed at a stress lower than the fracture strength of the ceramic. Examples cited of metals useful as the intermediate member include Ti, Au, Ag, Al, Pd, Cu, Ni, austenitic stainless steel or ferritic stainless steel.

The use of metal as an intermediate layer creates its own problems. In particular, during the initial start-up of the line, the intermediate layer must fill the gap between the journal and sleeve to prevent penetration of the gap with molten coating material. At operating temperature, the intermediate metal layer must accommodate the difference in thermal expansion between the sleeve and journal. Copper, cited as the preferred material for the intermediate layer, cannot be used to fill the entire gap when cold since it is not compressible and will overstress the sleeve at operating temperatures. The patent contemplates removing portions of the copper to allow it to expand to buffer the stress.

A material which has proven to be superior to even Sialon for use as a pot roller bearing sleeve is cemented tungsten carbide, which is a "cermet", a ceramic/metal composite material manufactured by mixing tungsten carbide powder, generally ranging in proportion between 70%-97% of the total weight, with a binder metal, usually cobalt or nickel, compacting the material in a die and then sintering. The term "cemented" refers to the tungsten carbide particles being captured in the metallic binder material and "cemented" together, forming a metallurgical bond between the tungsten carbide particles and the binder (WC-Co, WC-Ni, etc.), in the sintering process. Cemented tungsten carbide is resistant to all forms of wear (including sliding abrasion, erosion, corrosion/wear and metal-to-metal galling), exhibits a relatively high degree of toughness and high compressive strength, resists deflection, and retains its hardness values at high temperatures. In comparison with the hard, abrasion resistant cobalt-based alloys used in bearing systems for continuous metal coating lines, cemented tungsten carbide is also able to better withstand the higher temperatures of molten aluminum and the corrosion problems associated with coating strip with galvalume or aluminum.

As set forth in Praxair's U.S. Pat. No. 603,728, a highly effective pot roll bearing assembly combines a journal sleeve having a wear surface of a tungsten carbide composite in contact with Sialon bushings. The limiting factor in this assembly is the thickness of the tungsten carbide coating. Longer bearing life could be achieved if the thickness of the tungsten carbide layer could be increased. Hard tungsten carbide coatings also have a tendency to spall off the associated metal substrate under high loading conditions, such as high-tension lines where heavier gauge strip is being processed, as a result of fatigue cracking in the coating and at the discrete interface between the coating and the metal substrate.

The sleeve may consist of solid cemented tungsten carbide. The use of a solid cemented carbide sleeve also allows for a very significant reduction in the metal cementing phase compared to those formulations compatible with coating methods such as laser cladding. Lowering the cementing phase increases hardness, abrasive wear resistance and corrosion resistance of the cemented carbide which is especially important in dip-coating with aluminum or aluminum-containing alloy due to the higher operating temperature and increased corrosivity. The relative ease in being able to vary the level of the cementing phase in the solid cemented tungsten carbide sleeves allows for optimization of the relative loss in mass between the sleeves and ceramic bushings (e.g. sialon) in sliding contact with each other as a result of abrasive and/or chemical wear.

As a cemented tungsten carbide sleeve is somewhat brittle and has a coefficient of thermal expansion significantly lower than stainless steel, shrink fitting such a sleeve directly over a stainless steel journal is not practicable as the sleeve is highly prone to failure from hoop stress. For such a solid tungsten carbide sleeve, sealing the gap when cold and buffering the stress at operating temperatures cannot be done reliably using copper or the other metals cited in U.S. Pat. No. 6,037,287.

SUMMARY

What is needed is a bearing system for a sink roll bearing comprising a sleeve having a thick wear-resistant surface of cemented tungsten carbide. Of particular advantage would be such a bearing system incorporating a journal sleeve of a material such as solid cemented tungsten carbide.

Disclosed is a bearing system for use between a roller journal and a support frame in a molten metal hot dip coating line for steel strip, comprising a wear resistant sleeve attached to the journal; a bearing assembly comprising bushings for rotatably supporting the sleeve, wherein the sleeve is made from solid cemented tungsten carbide. An elastically compressible layer joins the sleeve to the journal, and the sleeve and the journal are mechanically coupled to rotate together. The journal sleeve is adapted to rotate within the bearing assembly. The bearing assembly comprises ceramic bushing components arranged to contact the outer surface of the sleeve; specific bushing and sleeve compositions having been selected to wear at a relative rate which maximizes the run time of the bearing system under the specific mechanical and chemical environment of use.

In one aspect, there is disclosed a bearing system for use between a roller journal and a support frame in a molten metal hot dip coating line for steel strip, comprising: a sleeve configured to attach to a journal; a bearing assembly comprising a bushing rotatably supporting the sleeve, wherein the sleeve is made from solid cemented carbide; and wherein an elastically compressible layer joins the sleeve to the journal, wherein the sleeve and the journal are mechanically coupled to rotate together.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated herein and constitute a part of this specification.

DETAILED DESCRIPTION

Before the present subject matter is further described, it is to be understood that this subject matter described herein is not limited to particular embodiments described and, as such, may of course vary. It is also to be understood that the terminology used herein is for the purpose of describing particular embodiments only and is not intended to be limiting. Unless defined otherwise, all technical terms used herein have the same meaning as commonly understood by one skilled in the art to which this subject matter belongs.

The prior art bearing system of FIG. 2 is suitable for use with a sleeve 100 made from metal, for example, a stainless steel sleeve 100 coated with a wear resistant layer, such as tungsten carbide. However, for a sleeve 100 made entirely from a cemented tungsten carbide, the bearing system of FIG. 2 is not practicable due to the difference in the thermal expansion. In particular, journal 90, typically made from stainless steel, has a substantially higher coefficient of thermal expansion than would a sleeve 100 made from cemented tungsten carbide. If a standard shrink or slip fitting is attempted, during heating, the journal 90 will increase in diameter much more than the sleeve 100 and the outer surface 170 of journal 90 will press against the inner surface 180 of sleeve 100, causing stress on the inner surface 180. As cemented tungsten carbide is inherently somewhat brittle, this internal circumferential stress, or hoop stress, will cause the sleeve 100 to crack and the bearing system to fail.

The Carbide Guide, published by General Carbide, discourages shrink-fitting a tungsten carbide sleeve over a steel journal, as follows:

"Shrink Guidelines—Carbide Cylinder Mounted Outside of a Steel Ring: Normally, tungsten carbide should not be subjected to tensile stress, thus a carbide sleeve shrunk over a steel shaft seems doomed to failure. However, sometimes it is necessary to do so and it can be successful. A complete set of stress calculations must be performed in these cases. Lamè's equations may be used if the subscripts "c" and "s" are reversed. Additional stresses must also be considered. Any operation above room temperature will rapidly increase the tensile stress at the carbide I.D. leading to premature failure. When the carbide is shrunk on the outside of the steel, the designer should use extreme caution and use only the minimum interference necessary.

In summary, if it is necessary to shrink-fit a carbide sleeve onto the outside of a steel shaft, all operating conditions and stresses must be considered." *The Carbide Guide*, Page 4-15.

Mounting a cemented carbide sleeve to a stainless steel journal according to the bearing assembly of FIG. 2 for use in a molten metal coating line creates several significant problems. First, a large gap will be needed at room temperature between the outer surface 170 of journal 90 and the inner surface 180 of sleeve 100 to allow for the higher thermal expansion of journal 90. During startup, preheating of the bearing assembly may not be sufficient to fully close this gap before the sink roller is immersed in the molten metal. Any penetration of molten metal into the gap will lead to rapid failure of the bearing assembly. Second, retaining ring 160 will expand more than lip 150, reducing the retaining force on lip 150. Third, sleeve 100 must be centered radially on journal 90 and must be coupled to journal 90 for rotation with journal 90 during operation. Unless a mechanical coupling such as welding is employed, the inner surface 180 of sleeve 100 must grip the outer surface 170 of journal 90 for the sleeve 10 to rotate with journal 90 within bearing assembly 80. However, if the amount of interference fit is increased to the level required for rotational coupling of sleeve 100 and journal 90, outer surface 170 of journal 90 will exert excessive stress on the inner surface 180 of sleeve 100, resulting in cracking and failure of the sleeve 100.

Figure 3:
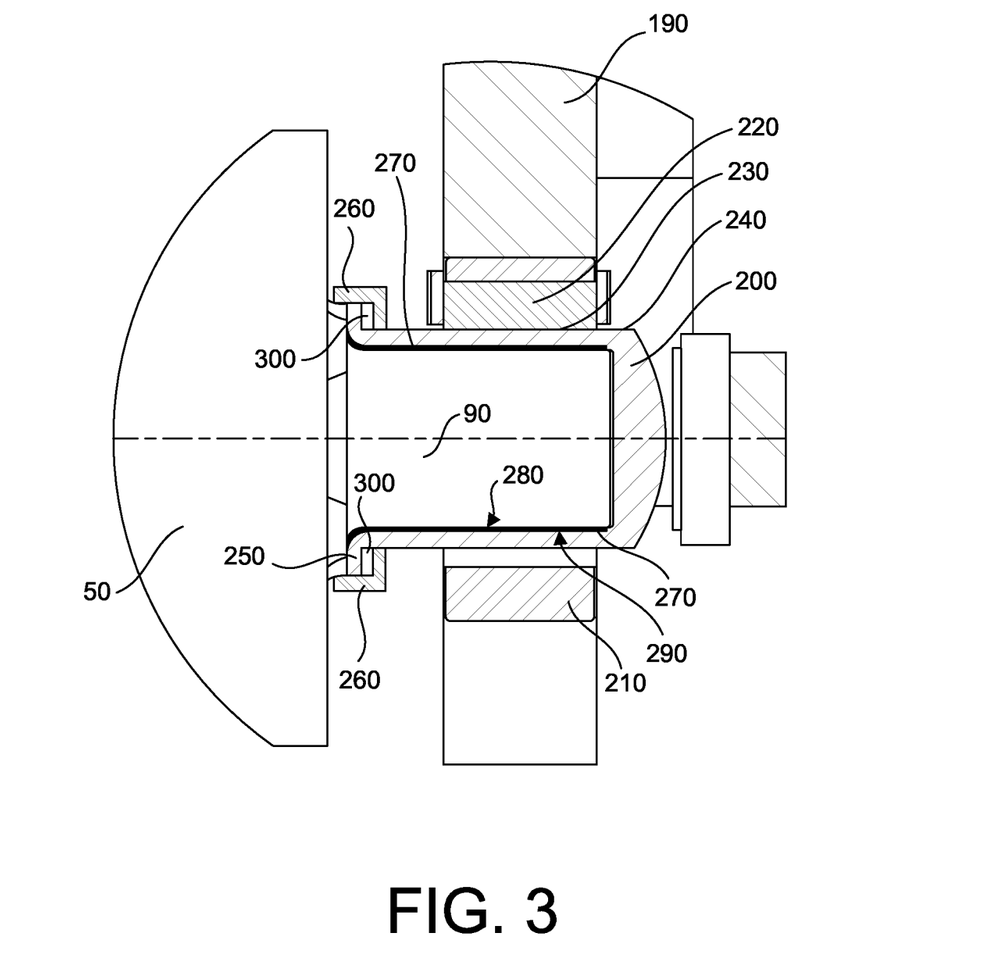
FIG. 3 is a sectional view of a bearing system.

FIG. 3 depicts an improved sink roller 50 fitted with a bearing system according to this disclosure. The bearing system includes a sleeve 200, fitted over journal 90 and a bearing assembly attached to support frame 190 and mounted around sleeve 200. The sleeve 200 can also be referred to as an endcap as the sleeve 200 is a cylindrical body with an open end and also a closed, capped end that caps an end of the journal 90. In this regard, the open end of the sleeve provides an opening into an internal cavity or chamber in which the journal 90 is positioned. The bearing assembly consists of a bearing housing 210 and bushings 220 having bushing surface 230 adapted to slidingly engage the outer surface 240 of sleeve 200. Sleeve 200 preferably includes lip 250. The bearing system also includes retaining ring 260. A compressible material 270 is positioned between the outer surface 280 of journal 90 and inner surface 290 of sleeve 200. The compressible material can be positioned along a portion of the region between the outer surface 280 of journal 90 and inner surface 290 of sleeve 200 or along the entirety of the region.

Bearing system also includes an expandable gasket 300 disposed between lip 250 and retaining ring 260.

Figure 4:
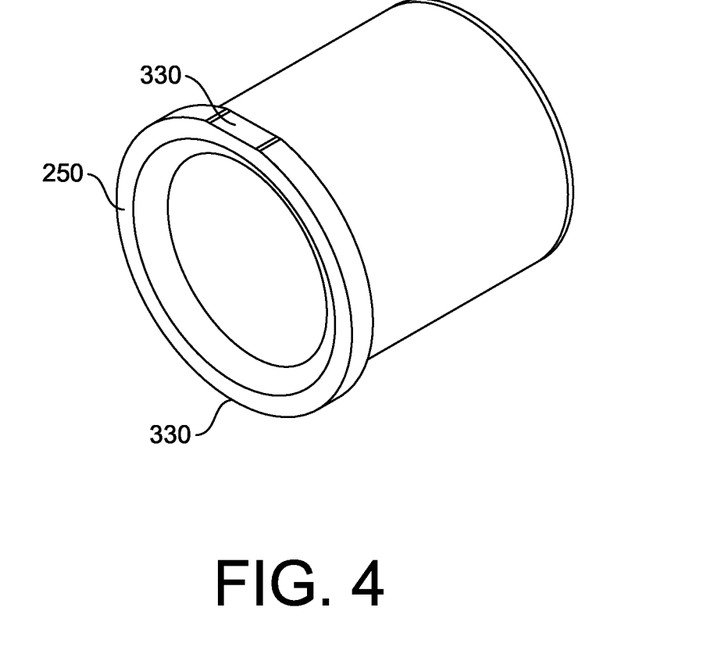
FIG. 4 is an isometric view of an example sleeve configuration.
Figure 5:
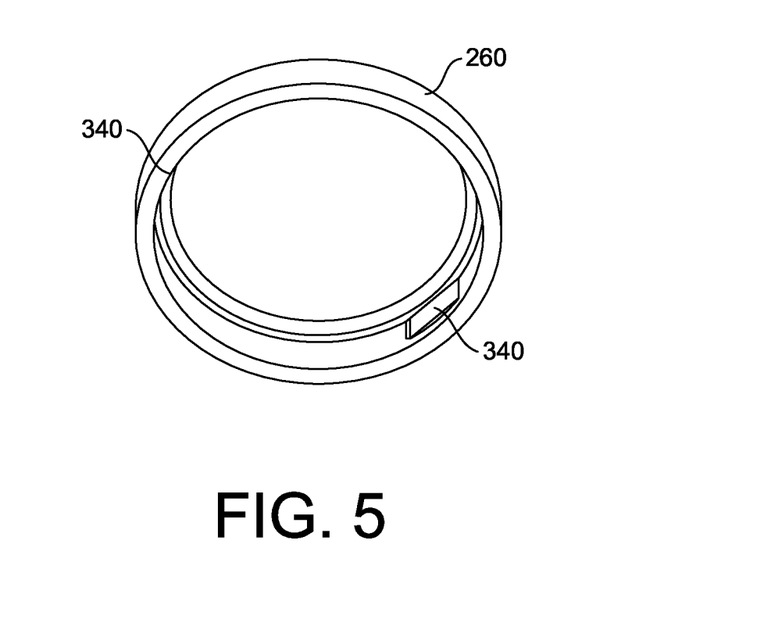
FIG. 5 is an isometric view of an example retaining ring.

In the bearing system of this disclosure, retaining ring 260 is positioned to mechanically engage lip 250 of sleeve 200 before retaining ring 260 is attached to journal 90, such as by welding. One configuration and method for this mechanical engagement is shown in FIG. 4 and FIG. 5, wherein lip 250 is provided with flat surfaces 330 and retaining ring 260 includes keys 340. During assembly, sleeve 200 is pushed onto journal 90, then expandable gasket 300 and retaining ring 260 are slid over sleeve 200. Keys 340 on retaining ring 260 are aligned with flat surfaces 330 on lip 250 so that retaining ring 260 engages sleeve 200 in a non-rotational manner before retaining ring 260 is welded to journal 90.

During preheating, journal 90, and retaining ring 260, both made from stainless steel, expand more than sleeve 200 and lip 250, which are preferably made from cemented tungsten carbide or a similar wear resistant material such as a ceramic, carbide or cermet. Expandable gasket 300 expands when heated to prevent the formation of a gap between retaining ring 260 and lip 250, keeping sleeve 200 firmly pressed against journal 90 and preventing penetration of molten metal between retaining ring 260 and lip 250.

Also during preheating, journal 90 expands radially more than sleeve 200, causing compressible material 270 to be compressed, and acts to center journal 90 radially within sleeve 200 and acts as a stress buffer to prevent the overstressing of inner surface 290 of sleeve 200.

Compressible material 270 should be able to withstand service loads and thermal cycling without excessive deformation. That is, compressible material 270 should deform elastically upon heating to operating temperatures and should recover some of its original size upon cooling when the bearing assembly 190 is taken out of service for maintenance or unscheduled line stoppages.

In an embodiment, journal 90 and retaining ring 260 are made from stainless steel (e.g. 316L) or carbon steel (e.g. E52100) depending on bath chemistry, and sleeve 200 is made from solid cemented carbide, such as tungsten carbide, titanium carbide, tantalum carbide or mixtures thereof, cemented with cobalt, and/or similar metals including nickel and molybdenum, ceramic or cermet material. In an embodiment, compressible material 270 preferably comprises compressible graphite, such as Graphoil. Other materials suitable for use as compressible material 270 include intumescent products containing graphite and or vermiculite. In an embodiment, the sleeve is made from solid cemented carbide containing between about 70% and 94% carbide.

Expandable material 300 can be a material which at the elevated operating temperature of the bearing assembly will maintain an expanded condition, such as a perlite-based material. Other materials suitable for use as the expandable material 300 include mineral or refractory ceramic fiber based materials containing vermiculite or intumescent graphite.

Figure 6:
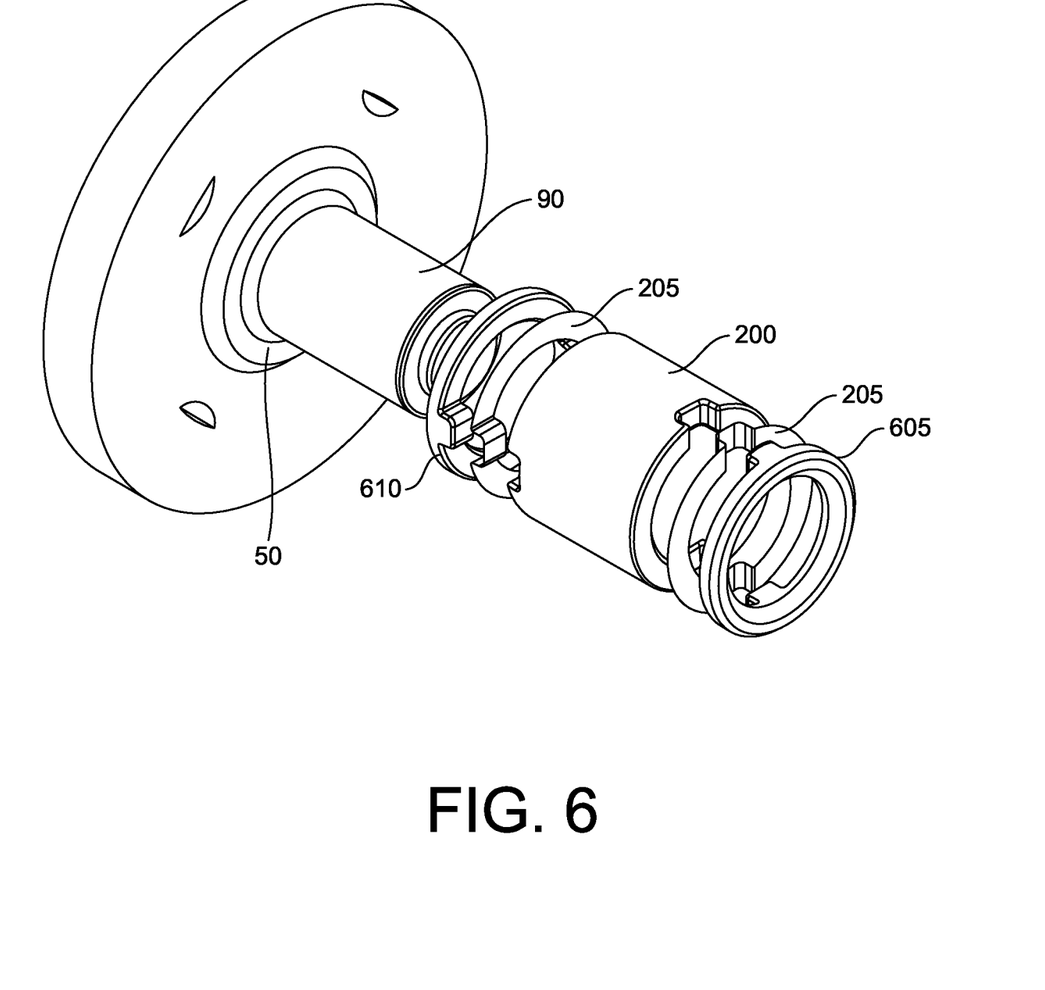
FIG. 6 shows another embodiment of a bearing system.

FIG. 6 shows a perspective view of another embodiment of a bearing system. The sleeve 200 is formed of a cylindrical body that is open at both ends and that has an internal cavity sized to receive the journal 90. An annular, first lock ring 605 couples to a first end of the sleeve 200 and an annular, second lock ring 610 couples to a second, opposite end of the sleeve 200. The rings 605 and 610 each have a key that mates with a corresponding key slot of the sleeve 200 to lock the sleeve 200 in place. In an assembled state, the ring 610 abuts the roller 50. A gasket 205 can be positioned in a gap or region between each of the lock rings 605/610 and the sleeve 200. The gasket(s) 205 can be made of an expandable material.

While this specification contains many specifics, these should not be construed as limitations on the scope of an invention that is claimed or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a sub-combination or a variation of a sub combination. Similarly, while operations are depicted in the drawings in a particular order, this should not be understood as requiring that such operations be performed in the particular order shown or in sequential order, or that all illustrated operations be performed, to achieve desirable results. Only a few examples and implementations are disclosed. Variations, modifications and enhancements to the described examples and implementations and other implementations may be made based on what is disclosed.

The invention claimed is:

1. A bearing system for use between a roller journal and a support frame in a molten metal hot dip coating line for steel strip, comprising:
   a sleeve configured to attach to a journal wherein the sleeve has a lip;
   a retaining ring that mechanically engages the lip of the sleeve wherein the lip of the sleeve forms a flat surface and wherein the retaining ring has at least one key that mates with the flat surface;
   a bearing assembly comprising a bushing rotatably supporting the sleeve, wherein the sleeve is made from solid cemented carbide; and
   wherein an elastically compressible layer joins the sleeve to the journal, wherein the sleeve and the journal are mechanically coupled to rotate together.

2. The bearing system of claim 1, wherein the bushing is positioned around the journal sleeve.

3. The bearing system of claim 1, wherein the at least one key aligns with the flat surface on the lip so that the retaining ring engages the sleeve in a non-rotational manner.

4. The bearing system of claim 1, wherein the compressible material is positioned between an outer surface of the journal and an inner surface of the sleeve.

5. The bearing system of claim 1, wherein the roller journal is attached to a roller.

6. The bearing system of claim 1, wherein the retaining ring is fixed to the journal via the lip of the sleeve.

7. The bearing system of claim 1, wherein, when heated, the journal and the retaining ring both expand more than the sleeve and the lip.

8. The bearing system of claim 1, wherein the compressible material comprises compressible graphite.

9. The bearing system of claim 1, wherein the compressible material comprises an intumescent material containing graphite or vermiculite.

10. The bearing system of claim 1, wherein the sleeve comprises a wear resistant material.

11. The bearing system of claim 1, wherein the sleeve contains between 70% and 94% carbide.

12. The bearing system of claim 1 wherein an expandable gasket is positioned between the retaining ring and the lip.

13. The bearing system of claim 12, wherein the expandable gasket expands when heated to prevent the formation of a gap between the retaining ring and the lip thereby keeping the sleeve firmly pressed against the journal and preventing penetration of molten metal between the retaining ring and the lip.

14. The bearing system of claim 1, wherein the journal and the retaining ring are made from stainless steel and the sleeve is made from solid cemented tungsten carbide.

15. The bearing system of claim 14, wherein the sleeve is made from tungsten carbide cemented with cobalt, carbide or cermet material.

16. The bearing system of claim 1, wherein the sleeve is configured to rotate within the bushing.

17. The bearing system of claim 16, wherein the sleeve has an outer surface and the bearing assembly comprises ceramic bushing components arranged to contact the outer surface of the sleeve.

18. A bearing system for use between a roller journal and a support frame in a molten metal hot dip coating line for steel strip, comprising:
   a sleeve configured to attach to a journal wherein the sleeve has a lip;
   a retaining ring that mechanically engages the lip of the sleeve wherein an expandable gasket is positioned between the retaining ring and the lip;
   a bearing assembly comprising a bushing rotatably supporting the sleeve, wherein the sleeve is made from solid cemented carbide; and
   wherein an elastically compressible layer joins the sleeve to the journal, wherein the sleeve and the journal are mechanically coupled to rotate together.

19. The bearing system of claim 18, wherein the bushing is positioned around the journal sleeve.

20. The bearing system of claim 18, wherein the compressible material is positioned between an outer surface of the journal and an inner surface of the sleeve.

21. The bearing system of claim 18, wherein the roller journal is attached to a roller.

22. The bearing system of claim 18, wherein the retaining ring is fixed to the journal via the lip of the sleeve.

23. The bearing system of claim 18, wherein, when heated, the journal and the retaining ring both expand more than the sleeve and the lip.

24. The bearing system of claim 18, wherein the expandable gasket expands when heated to prevent the formation of a gap between the retaining ring and the lip thereby keeping the sleeve firmly pressed against the journal and preventing penetration of molten metal between the retaining ring and the lip.

25. The bearing system of claim 18, wherein the compressible material comprises compressible graphite.

26. The bearing system of claim 18, wherein the compressible material comprises an intumescent material containing graphite or vermiculite.

27. The bearing system of claim 18, wherein the sleeve comprises a wear resistant material.

28. The bearing system of claim 18, wherein the sleeve contains between 70% and 94% carbide.

29. The bearing system of claim 18, wherein the lip of the sleeve forms a flat surface and wherein the retaining ring has at least one key that mates with the flat surface.

30. The bearing system of claim 29, wherein the at least one key aligns with the flat surface on the lip so that the retaining ring engages the sleeve in a non-rotational manner.

31. The bearing system of claim 18, wherein the journal and the retaining ring are made from stainless steel and the sleeve is made from solid cemented tungsten carbide.

32. The bearing system of claim 31, wherein the sleeve is made from tungsten carbide cemented with cobalt, carbide or cermet material.

33. The bearing system of claim 18, wherein the sleeve is configured to rotate within the bushing.

34. The bearing system of claim 33, wherein the sleeve has an outer surface and the bearing assembly comprises ceramic bushing components arranged to contact the outer surface of the sleeve.

\* \* \* \* \*